Figure 1:
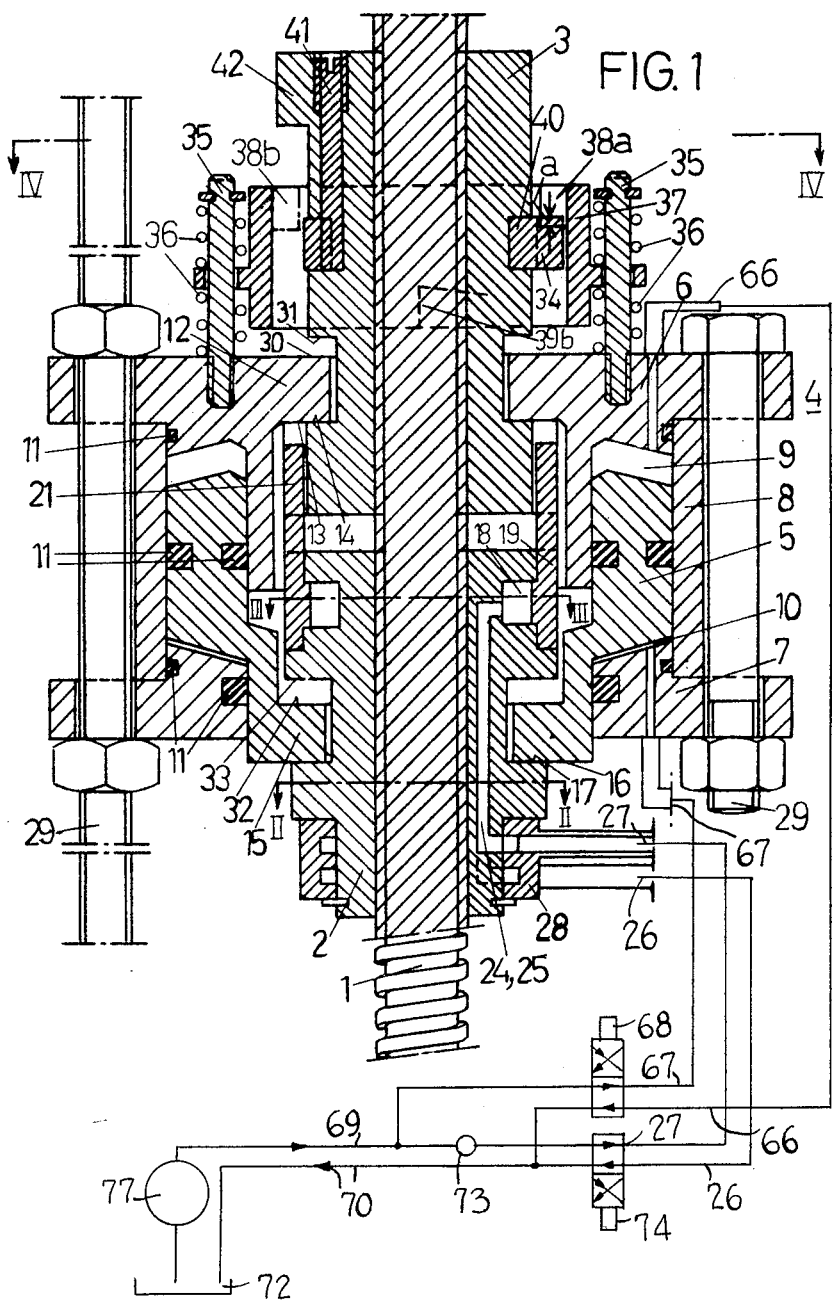

INVENTOR.
Erik Johan von Heidenstam
Gustav Olov von Heidenstam
BY
Attorneys

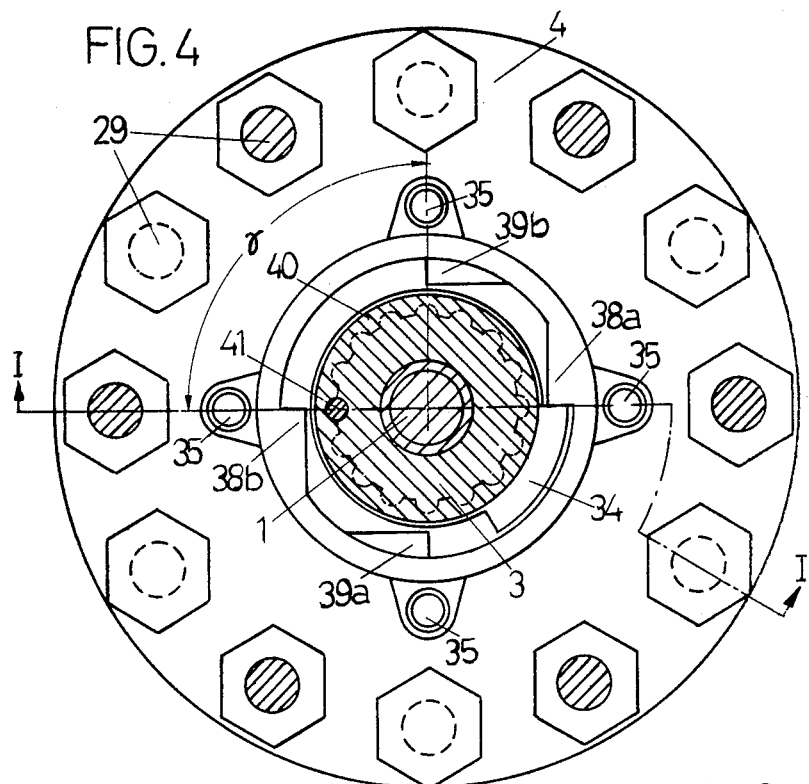
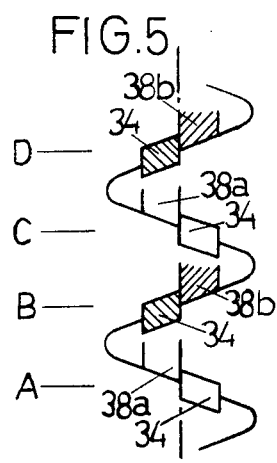
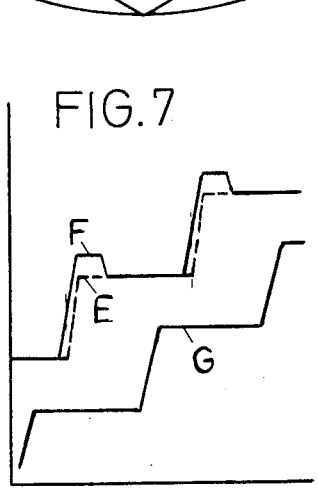
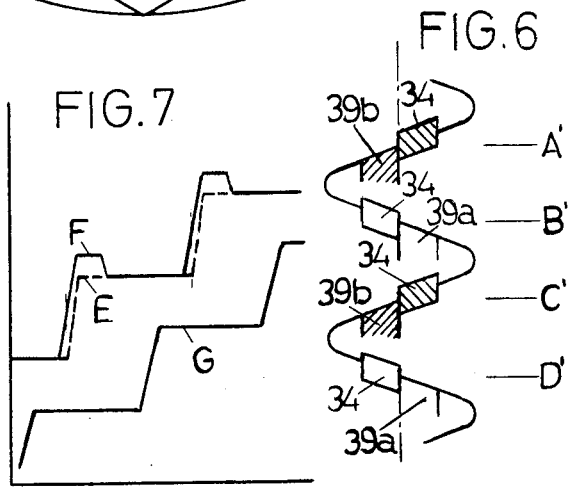
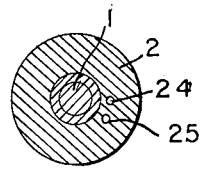
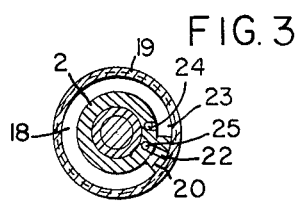

*INVENTOR.*
Erik Johan von Heidenstam
BY Gustav Olov von Heidenstam

Attorneys

Jan. 25, 1966  E. J. VON HEIDENSTAM ET AL  3,230,784
JACK AND LIFTING EQUIPMENT
Filed Dec. 3, 1962  4 Sheets-Sheet 4
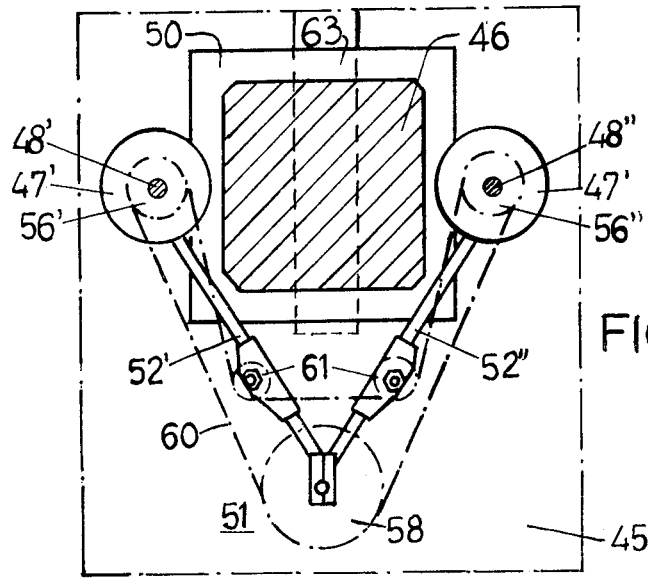
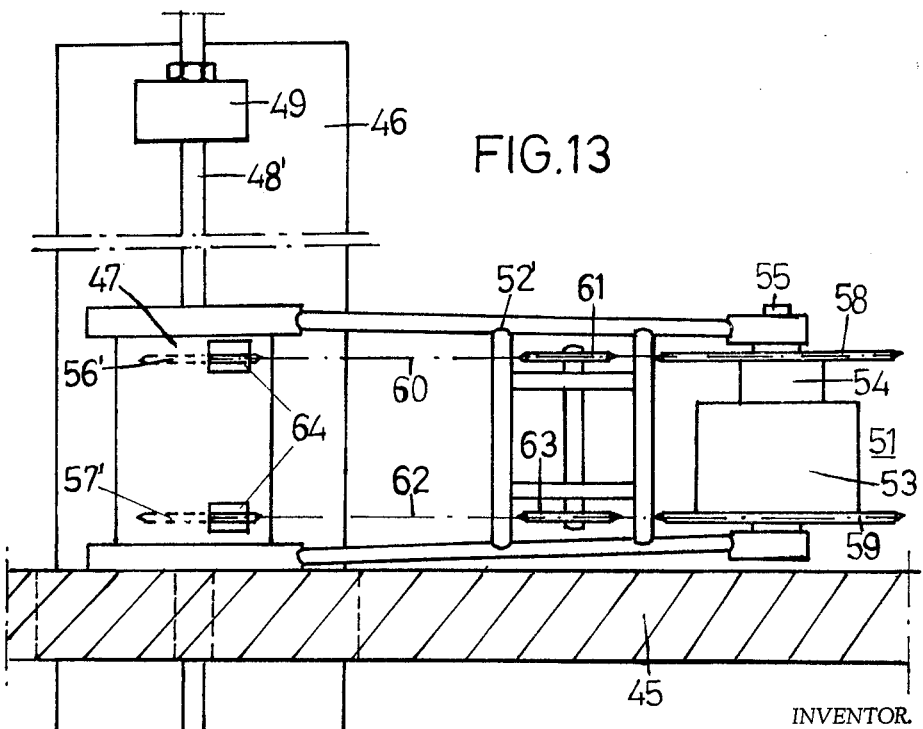
INVENTOR.
Erik Johan von Heidenstam
BY Gustav Olov von Heidenstam
Attorneys United States Patent Office 3,230,784
Patented Jan. 25, 1966

1

3,230,784
JACK AND LIFTING EQUIPMENT
Erik Johan von Heidenstam, 58 Regeringsgatan, Stockholm, Sweden, and Gustav Olov von Heidenstam, Stockholm, Sweden; said Gustav Olov von Heidenstam assignor to said Erik Johan von Heidenstam
Filed Dec. 3, 1962, Ser. No. 241,778
Claims priority, application Sweden, Dec. 11, 1961, 12,395/61
27 Claims. (Cl. 74—111)

This invention relates to an improved jack of the type, which cooperates with a threaded rod for moving a load in the longitudinal direction of the rod, and to a lifting equipment for raising a load along one or several vertical load-bearing columns by means of two or several jacks of the type mentioned above operating between the load and the vertical load-bearing columns, in particular an equipment for lifting floor slabs for the erection of large floor area building structures by means of the lift-slab method of construction.

In particular the present invention is related to improved jacks of the type, which cooperates with a threaded rod for moving a load in the longitudinal direction of the rod and which comprises a first nut and a second nut individually rotatable around the rod, force generating means including at least two members reciprocatingly movable relative one another in the direction of the rod, while exerting a mutual force in the direction of the rod, and in which one member of said force generating means is provided with at least one seat surface adapted to cooperate with a corresponding seat surface on said first nut, when said member is stationary relative the rod, for transferring the load between said first nut and said member, and the other member of the force generating means is provided with at least one seat surface adapted to cooperate with the corresponding seat surface on said second nut, when said last mentioned member is stationary relative the rod, for transferring the load between said second nut and said member, and in which said first and second nuts are connected to means for alternately rotating the nuts in one and the same direction around the rod in step with the relative movement of the movable members of the force generating means.

In a jack of this type the force generating means may preferably consist of a hydraulic device having at least one cylinder and a piston movable within the cylinder in the longitudinal direction of the rod. Also other types of force generating means having the same type of operation as a hydraulic cylinder with a piston may however be used. Thus the force generating means may for instance consist of a nut and a screw, which, when they are reciprocatingly rotated with respect to one another by means of an external force, will move reciprocatingly relative one another in the axial direction while producing a force in this direction.

Jacks of this type may be so designed that the rod is stationary, while a member of the force generating means, e.g. the cylinder or the piston in a hydraulic device, is connected to the load to be moved by means of the jack, so that the jack consisting of the force generating means and the two nuts will be displaced together with the load relative the rod. Alternatively the jack may, however, also be designed in such a way that a member in the force generating means is stationary, while the rod is movable and connected to the load, in which case the jack proper consisting of the force generating means and the two nuts will be stationary, while the rod with the load attached thereto will be displaced relative the jack. It is however also possible to design a jack of this type in such a way that it is reversible, i.e. it may be operated either with a stationary rod and the jack movable together with the load or with a stationary jack and the rod movable together with the load. In this case, however, the force generating means must be double-acting so that it can generate a force alternatively when its two mutually movable members are moved towards each other or when they are moved away from one another, and one of these members of the type generating means must be provided with two seat surfaces cooperating in such a way with corresponding seat surfaces on the one nut that the load may be transferred alternatively from this member to the nut or vice versa, and the other member of the force generating means must also be provided with two seat surfaces so cooperating with corresponding seat surfaces on the other nut that the load may be transferred alternatively from this second member to this other nut or vice versa. Further said two members of the force generating means must be unobstructedly movable in the longitudinal direction of the rod with respect to the associated nut over a distance, which exceeds the length of the stroke relative movement between the members of the force generating means, and the means for rotating the nuts must be capable of alternately rotating the nuts in either direction around the rod.

It is a fundamental problem in jacks of the type described above that the actual length of the stroke of the jack, i.e. the length of the movement of the load for each working stroke of the force generating means, is determined by the length of the stroke of the force generating means, i.e. by the length of the mutual movement between the movable members of the force generating means, e.g. the mutual movement between the cylinder and the piston in a hydraulic force generating device. The length of the stroke of the force generating means is however not always constant but may vary somewhat from one jack to another, even if these are of the same construction. Even in one and the same jack the length of the stroke of the force generating means may vary with the time and outer conditions. It is consequently not possible to accurately determine the actual strength of the stroke of the jack, which is a serious disadvantage, particularly in a lifting equipment comprising several jacks working in parallel for lifting a load, as for instance in a lifting equipment for rasing floor slabs along vertical load bearing columns when erecting building structures by the lift-slab method. In such cases it is absolutely essential that the movements of all jacks are equally large so that a uniform lifting of the slab is guaranteed.

Another problem in a jack of this type is to obtain an easy reversibility of the operation of the jack so that the jack can operate either with the load attached to the jack and the threaded rod stationary or with the jack stationary and the load attached to the threaded rod and so that the mode of operation of the jack can be easily changed without any extensive adjustments of the jack itself.

A further problem in jacks of this type is to provide a simple and reliable device for alternately rotating the two nuts of the jack around the rod in step with the operation of the force generating means of the jack. Particularly in a reversible jack, in which the nuts must be alternately rotated in either one direction around the rod or in the opposite direction around the rod in dependence of the mode of operation of the jack, it is a problem to provide simple means which can perform both these rotations of the nuts.

It is a primary object of the present invention to provide a novel and improved jack of the type described above, for which the actual length of the stroke of the jack, i.e. the actual length of each incremental movement of the load, is accurately determinable and constant and independent of normal variations in the length of the stroke of the force generating means in the jack.

Another primary object of the invention is to provide a reversible jack of the type described above, which can operate either with the jack stationary and the load attached to the threaded rod or with the threaded rod stationary and the load attached to the jack, and for which the mode of operation can be changed without any readjustment of the jack itself, and for which the actual length of stroke of the jack is accurate and constant, whether the jack is operating with a stationary threaded rod or with a movable threaded rod attached to the load.

Yet another primary object of the present invention is to provide a jack of the type described above including in the jack itself simple and reliable means for rotating the two nuts of the jack alternately around the rod, and which is capable of rotating the nuts in either direction around the rod, so that the mode of operation of the jack may be changed without any adjustment of the means rotating the nuts.

A further primary object of the invention is to provide a jack of the described type including means automatically indicating when the jack has completed a stroke, i.e. indicating each incremental movement of the load.

With the above objects in view the present invention provides a jack adapted to cooperate with a threaded rod for moving a load in the direction of said rod, said jack comprising a first nut and a second nut individually rotatable around said rod; force generating means including at least two members reciprocatingly movable relative one another in the direction of said rod while exerting a mutual force in the direction of the rod; a seat surface on one of said members of said force generating means adapted to cooperate with a corresponding seat surface on said first nut, when said member is stationary with respect to said rod, for transferring said load between said member and said first nut; a seat surface on the other member of said force generating means adapted to cooperate with a corresponding seat surface on said second nut, when said other member is stationary with respect to the rod, for transferring said load between said other member and said second nut; means for rotating said first and second nuts alternately in the same direction around the rod in step with the movement of said members of said force generating means relative the rod; and locking means between said first nut and said member of said force generating means cooperating with said first nut for stopping and locking said first nut in a predetermined angular locking position, when said first nut is rotated in said direction and said member is stationary relative the rod, and for releasing said first nut, when said member is moved relative the rod, whereby, when said member is moved relative the rod, said first nut is rotatable a predetermined angle around the rod until it again reaches an angular locking position defined by said locking means.

In a preferred form of the jack according to the invention the locking means between said first nut and said member of said force generating means cooperating with said first nut include a tooth on said first nut extending radially outwards from the nut and a limit stop on said member disposed to engage said tooth and thereby stop said first nut in a predetermined angular locking position, when the nut is rotated in one direction around the rod, and to disengage said tooth and thereby release the nut, when said member is moved relative the rod in the longitudinal direction of the rod corresponding to said direction of rotation.

In another preferred form of the jack according to the invention the locking means between said first nut and said member of said force generating means cooperating with said first nut is capable of defining several different angular locking positions for said first nut evenly spaced around said rod and includes a tooth on said first nut extending radially outwards from the nut and a plurality of limit stops on said member of said force generating means, said limit stops being disposed in one and the same plane perpendicular to the direction of the rod and evenly spaced around the rod for engaging said tooth when said first nut is rotated around the rod in one direction so that they are capable of stopping said first nut in different angular locking positions.

The invention provides also a jack cooperating with a threaded rod for moving a load in either direction of the rod and being reversible so that the jack may operate either with a stationary rod and the load attached to the jack or with a movable rod attached to the load and the jack stationary, said jack comprising a first nut and a second nut individually rotatable in either direction around said rod, force generating means including at least two members reciprocatingly movable relative one another in the longitudinal direction of the rod while exerting a contracting force when moving towards each other and a separating force when moving away from each other, two seat surfaces on one of said members of said force generating means alternatively cooperating with corresponding seat surfaces on said first nut, when said member is stationary relative the rod, for transferring said load from said member to said first nut and vice versa respectively; two seat surfaces of the other member of said force generating means alternatively cooperating with corresponding seat surfaces on said second nut, when said other member is stationary relative the rod, for transferring said load from said other member to said second nut and vice versa respectively; means for rotating said nuts alternately in either direction around said rod in step with the relative movement of said members of said force generating means, first locking means between said first nut and said member of said force generating means cooperating with said first nut for stopping and locking said first nut in a predetermined angular locking position, when said first nut is rotated in one direction around the rod and said member is stationary relative the rod, and for releasing said first nut, when said member is moved relative the rod in the direction of the rod corresponding to said direction of rotation of the nut; second locking means between said first nut and said member of said force generating means cooperating with said first nut for stopping and locking said nut in a predetermined angular locking position, when said first nut is rotated in the opposite direction around the rod and said member is stationary relative the rod, and for releasing said first nut, when said member is moved relative the rod in the direction of the rod corresponding to said opposite direction of rotation of the nut.

Further the invention provides a jack as defined in any one of the four preceding paragraphs comprising signal generating means on said member of said force generating means cooperating with said first nut and actuating means on said first nut for actuating said signal generating means each time said first nut occupies an angular locking position defined by the locking means between said first nut and said member.

Yet another important object of the present invention is to provide a simple and reliable lifting eqiupment for raising a load in vertical direction along a stationary, substantially vertical load bearing column, in particular for lifting floor-slabs or lift-slabs along vertical supporting columns, when erecting large floor area building structures according to the lift-slab method of construction. In the lift-slab method of construction the lift slabs, which will form the floors for the upper storeys of the building unit under construction are cast on the ground at the building site around or under an array of supporting columns, and are subsequently raised by means of a lifting equipment along the columns into place and fastened to the columns. For this purpose one has hitherto used a lifting equipment comprising lifting jacks mounted on the tops of the supporting columns and arranged to lift the lift-slabs by means of lifting rods extending from the jacks downwards parallel to the columns and having their lower ends attached to the lift-slab or the lift-slabs to be raised. It is, however, a very complicated and time-consuming task to mount and adjust the jacks on the tops of the supporting columns. A further serious problem, when using a lifting equipment of this type, is due to the fact that in most high multi-storey building structures each supporting column must normally consist of two or several sections, which are arranged on top of each other. In this case the first or lowest section of the supporting columns are erected at first and the lift-slabs are raised along this first section by means of lifting jacks mounted on top of this first section and are temporarily parked below the top of this first section of the columns. Thereafter it will be necessary to remove the jacks from the tops of the columns and erect the second section of the columns on top of the first section, whereafter the jacks must be mounted on top of this second section of the columns so that the lift-slabs can be raised further along this second section of the columns and so on. It is evident that a considerable amount of work and time is required for dismounting the jacks, erecting the next section of the supporting columns and remounting the jacks on top of this next section.

Consequently, it would be preferable to have the jacks mounted on the first or uppermost lift-slab and cooperating with stationary threaded rods extending parallel to the supporting columns and having their upper ends attached to the columns near to the top of the first section of the columns so that the jacks will be raised to the top of the first section of the supporting columns together with the first lift-slab. In this way it will be possible to erect the entire lifting equipment on the first lift slab, when this is at ground level. When the first lift-slab has been raised to the top of the first section of the columns it can be temporarily parked immediately below the top of this section, whereafter the threaded rods are disconnected from the columns and their lower ends are attached to further lift-slabs, which can then be raised by the jacks, now stationarily connected to the supporting columns, by means of the threaded rods now movable and serving as lifting rods. During the process of raising these further lift-slabs to the top of the first section of the supporting columns a second section of the supporting columns may be erected on top of the first section, which will result in a considerable saving of work and time. When all lift-slabs, except those which are to be permanently fastened to the first section of the supporting columns, have been raised to the top of the first section and temporarily parked there, the first or uppermost lift-slab carrying the lifting equipment may be raised further to the top of the second section of the supporting columns together with the lifting equipment and parked at the top of this second section and so on.

In a lifting equipment of this type it will, however, be necessary to have for each supporting column at least two separate jacks symmetrically disposed relative the column at opposite sides thereof in order to avoid bending forces on the column. It is evident that it is mandatory that these two jacks operate in complete synchronism and have accurately the same length of stroke. Further the two jacks and the control equipment for the jacks must be so disposed relative the supporting column that they do not hinder the erection of the next section of the supporting column on the top of a section, at the top of which the first lift-slab is parked together with the lifting equipment.

For these objects the invention provides a lifting equipment for lifting a load, particularly a lift-slab, along a stationary substantially vertical column, comprising at least two jacks cooperating with each one threaded rod; said rods being parallel to said column and disposed symmetrically relative the column at opposite sides thereof; each jack including a first nut and a second nut individually rotatable around the rod cooperating with said jack, force generating means including at least two members reciprocatingly movable relative one another in the longitudinal direction of the rod while exerting a mutual force in the direction of the rod, at least one seat surface on one of said members of said force generating means adapted to cooperate with a corresponding seat surface on said first nut, when said member is stationary relative the rod, for transferring a portion of said load between said member and said first nut, at least one seat surface on the other member of said force generating means adapted to cooperate with a corresponding seat surface on said second nut, when said member is stationary relative the rod, for transferring said portion of said load between said member and said nut; at least one of said jacks comprising locking means between said first nut in the jack and said member of said force generating means cooperating with said first nut for stopping and locking said nut in at least one predetermined angular locking position, when the nut is rotated around the rod and said member is stationary relative the rod, and for releasing said first nut, when said member is moved relative the rod in the longitudinal direction of the rod; a separate torque generating device common to both said jacks for alternately rotating said first nut in both said jacks and said second nut in both said jacks in the same direction around associated rods; said torque generating device being disposed substantially symmetrically with respect to said jacks at one side of said column and comprising two mutually rotatable, coaxial members, one of said members being coupled through driving means to said first nut in both said jacks and said other member being coupled through driving means to said second nut in both said jacks.

Figure 8A:
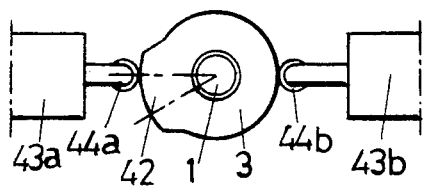
Figure 8B:
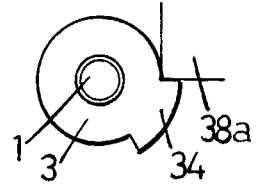
Figure 9A:
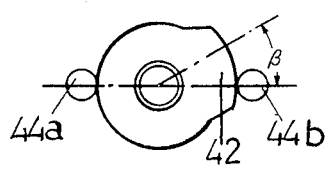
Figure 9B:
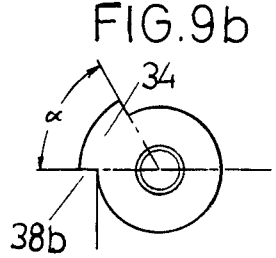

Other objects and further novel features of the present invention will become more fully apparent from the appended claims and as the ensuing detailed description and discussion proceeds in conjunction with the accompanying drawing, in which FIG. 1 is a longitudinal section through a reversible jack according to the invention, designed for an actual length of the stroke corresponding to half a turn of the nut, FIGS. 2 and 3 are cross sections through the jack shown in FIG. 1 along the lines II—II and III—III respectively, FIG. 4 is a section through the jack shown in FIG. 1 along the line IV—IV in FIG. 1, FIGS. 5 and 6 are schematic diagrams showing the relative positions of the tooth on the nut and the limit stops at the end of successive working strokes and rotations of the nut, FIG. 5 illustrates the mode of operation of the jack when the rod is stationary and the one member of the force generating means of the jack is connected to the load and consequently is moved together with the load, and FIG. 6 illustrates the mode of operation of the jack when the one member of the hydraulic force generating means of the jack is stationary and the rod is movable together with the load, FIG. 7 is a schematic diagram illustrating the relative movement of the nut carrying the tooth, the member of the hydraulic force generating means carrying the limit stops and the other member of the force generating means during two successive working strokes of the jack, when this is operating with a stationary rod, FIG. 8a shows schematically the cooperation between a cam on the nut provided with the tooth in the jack shown in FIGS. 1–7 and two signal generating devices in the form of micro-switches arranged on the member of the hydraulic force generating means carrying the limit stops;

FIG. 8b shows the nut in the same position as FIG. 8a but illustrates the cooperation between the tooth on the nut and one of the limit stops, FIGS. 9a and 9b correspond to FIGS. 8a and 8b but show the nut in the other locking position, FIGS. 10a and 10b and FIGS. 11a and 11b correspond to FIGS. 8a and 8b and FIGS. 9a and 9b respectively but show the nut in the locking positions it assumes when rotated in the opposite direction around the rod.

FIGURE 12 is a top view of a lifting equipment according to the invention for lifting a load, particularly a lift-slab, along a vertical, stationary, load-bearing column; and FIG. 13 is a side view of this lifting equipment seen from the left in FIG. 12.

The jack according to the invention shown in FIGS. 1–11b in the drawing comprises a threaded rod 1 and two nuts 2 and 3 rotatable relatively to one another around the rod. The jack comprises further a hydraulic force generating means consisting of an annular cylinder 4 arranged coaxially around the rod in which cylinder an annular piston 5 is movable in the longitudinal direction of the rod 1. The piston 5 is projecting out of the cylinder 4 through its inner wall. The cylinder consists of two substantially annular end plates 6 and 7 kept together by means of bolts 29 and a cylindric jacket 8. The pressure chambers 9 and 10 on opposite sides of the piston 5 are connected to pressure medium conduits 66 and 67 respectively. Conduits 66 and 67 can be connected by a directional value 68 to a pipe 69 extending from a pressure medium pump 71 supplied with pressure medium from a pressure medium tank 72 or to a discharge pipe 70 ending in pressure medium tank 72. Reference character 11 designates necessary packings of suitable type. The upper end plate 6 of the cylinder is provided with an annular flange 12 extending radially inwards, the lower surface 13 of which may rest against an annular shoulder 14 on the upper nut 3 and the upper surface 30 of which may rest against a second annular shoulder 31 on the nut 3. Similarly the piston is provided with an annular flange 15 extending radially inwards, the lower surface 16 of which may rest against an annular shoulder 17 on the lower nut 2 and the upper surface 32 of which may rest on a second annular shoulder 33 on the nut 2. In the shown embodiment of the invention the means for rotating the nuts 2 and 3 alternately consists of a hydraulic torque motor, which consists of an annular channel 18 in the nut 2 extending concentric around the rod 1 somewhat less than one turn (FIG. 3). The channel 18 is on the outside enclosed by a sleeve 19 which is rotatable around the nut 2 and is provided with a vane 20 projecting into the channel 18, which serves as the pressure chamber of the hydraulic torque motor, whereby said vane 20 will serve as the piston in the torque motor. The sleeve 19 is by means of a claw-coupling 21 connected to the upper nut 3 in such a way that the sleeve 19 is axially movable but not rotatable relatively to the nut 3. Pressure medium may be supplied to and discharged from the two pressure chambers 22 and 23 in the torque motor through pressure medium ducts 24, 25 arranged in the nut 2. The duct 24 debouches in the chamber 23 in the torque motor and the other duct 25 debouches in the other chamber 22. The two pressure medium ducts 24 and 25 are connected to external pressure medium conduits 26, 27 through a sleeve 28, which encloses the nut and is rotatable relatively to the nut. Pressure medium conduits 26 and 27 can, like pressure conduits 66 and 67, be connected alternatively, by a directional valve 74, to a pipe 69 leading from pressure medium pump 71 or to the discharge pipe 70 leading to pressure medium tank 72. As the torque motor which rotates nuts 2 and 3 operates with a lower fluid pressure than the hydraulic motor comprising cylinder 4 and piston 5, a pressure reduction device 73 of suitable type is inserted in the conduit between directional valve 74 and pressure medium pump 71. The upper nut 3 is provided with a tooth 34 projecting radially outwards and firmly attached to the nut. On the upper end plate 6 of the cylinder 4 bolts 35 parallel with the rod 1 are attached, which bolts by means of springs 36 carry a ring 37 provided with two limit stops 38a and 38b spaced 180° relatively to one another around the rod and arranged to cooperate with the tooth 34, when the nut is rotated upwards along the rod in FIG. 1, and two limit stops 39a and 39b (FIG. 4) also spaced 180° relatively to one another around the rod 1 and arranged to cooperate with the tooth 34, when the nut is rotated downwards along the rod 1 in FIG. 1.

In the embodiment shown in the drawings it is assumed that the rod 1 is stationary, while the cylinder 4 is connected to the load for instance through the bolts 29 and consequently moves relatively to the rod 1 together with the load. In the position of the jack shown in FIG. 1 the weight of the load is consequently transferred from the cylinder 4 to the stationary rod 1 through the surfaces 13, 14 on the cylinder 4 and the upper nut 3 respectively. The raising of the load relatively to the rod 1 from this position is performed in the following way. The directional valve 68 is placed in the position shown in FIGURE 1 to connect pressure medium conduit 67 from the lower chamber 10 of the cylinder to the pressure pipe 69 from the pump 71 and the pressure medium conduit 66 from the upper chamber 9 in the cylinder to the discharge pipe 70. As a consequence, pressure medium is forced by the pump 71 under pressure into the lower cylinder chamber 10 at the same time that pressure medium is discharged from the upper cylinder chamber 9 through the discharge pipe 70 to the pressure medium tank 72. Due to this the piston 5 is forced upwards, while the cylinder 4 remains stationary. During this movement of the piston 5 the seat surface 16 of the piston 5 is raised from the seat surface 17 on the lower nut, which is consequently released. Simultaneously or thereafter or eventually when the movement of the piston is completed, the directional valve 72 is placed in the position shown in FIGURE 1, connecting the conduit 27 communicating with the chamber 22 in the torque motor through pressure reduction device 73 to the pipe 69 from pump 71 and, also, connecting the conduit 26 communicating with the chamber 23 in the torque motor to discharge pipe 70. As a result, pump 71 forces pressure medium under pressure into the chamber 22 of the torque motor; and, at the same time, pressure medium is discharged from chamber 23 of the torque motor through discharge pipe 70 into pressure medium tank 72. As the upper nut 3 is locked by the force acting between the seat surfaces 13 and 14 and between the nut and the rod 1, whereas the lower nut 2 is free and unloaded, this nut 2 will be rotated counter-clockwise in FIG. 3 relatively to the piston 20 and the sleeve 19, i.e. relatively to the upper nut 3. The lower nut 2 is consequently rotated upwards along the rod 1 until the shoulder 17 again reaches the seat surface 16 on the piston 5, which is now in its upper position in the cylinder 4.

When the annular piston 5 now is in its upper position in cylinder 4, directional valve 68 is switched to its opposite position. This connects the pressure medium conduit 66 communicating with the upper chamber 9 in the cylinder to the pressure pipe 69 from pump 71 and also connects the pressure medium conduit 67 communicating with the lower chamber 10 of the cylinder to discharge pipe 70, forcing the pressure medium into the upper chamber 9 of the cylinder and, at the same time, discharging the pressure medium in the lower chamber 10 of the cylinder. Due to this the piston 5 will move downwards relatively to the cylinder 4. As the piston 5 is now supported by the shoulder 17 on the nut 2, the cylinder 4 will in reality be lifted together with the load upwards relatively to the piston 5 and the stationary rod 1 with the nuts 2 and 3. The weight of the load is during this movement transferred to the rod 1 from the cylinder 4 through the pressure medium in the upper cylinder chamber 9, the piston 5, the seat surfaces 16 and 17 and the nut 2. During this stroke consequently the seat surface 30 of the cylinder 4 will be raised from the shoulder 14 on the upper nut 3, which nut consequently is unloaded. When the cylinder 4 is lifted somewhat further upwards relatively to the rod 1 and the nut 3, the limit stop 38a will evidently release the tooth 34 on the nut 3 from the stop position indicated by A in FIG. 5. In this way the nut 3 becomes free to rotate upwards along rod 1. Such rotation of nut 3 is effected by switching directional valve 74 to its opposite position, connecting the pressure medium conduit 26 communicating with the chamber 23 in the torque motor to the pressure pipe 69 from the pump 71 and connecting the pressure medium conduit 27 communicating with the chamber 22 in the torque motor to discharge pipe 70. As a consequence, pump 71 forces pressure medium under pressure through pressure medium conduit 27 into the chamber 23 of the torque motor and simultaneously discharging the pressure medium in the chamber 22 of the torque motor through pipe 70. As nut 2 is locked in position by the forces generated by the load being lifted and nut 3 is free to rotate around rod 1, the changing of the position of directional valve 74 will cause the nut 3 to be rotated by the sleeve 19 in a counter-clockwise direction in FIG. 3, i.e. upwards along the rod 1 in FIG. 1. The rotation of the nut 3 around the rod will, however, be limited to accurately one half of a complete turn due to the fact that the tooth 34 will strike the other limit stop 38b in the stop position indicated by B in FIG. 4. The limit stop 38b namely due to the lifting of the cylinder 4 and the load connected thereto caused by the stroke of the hydraulic force generating means been displaced upwards relatively to the rod such a distance that it stops the tooth 34 after half a turn of the nut 3. It is assumed that the length of the stroke of the hydraulic force generating means and consequently the length of the movement of the cylinder 4 caused thereby is larger than the distance corresponding to half a turn of the nut 3 around the rod 1 so that the rotation of the nut is interrupted through cooperation between the tooth 34 and the limit stop 38b and not because the shoulder 13 of the nut strikes against the seat surface 13 on the cylinder 4. When the rotation of the nut has been finished and the working stroke of the hydraulic force generating means is completed, the seat surfaces 13 and 14 on the cylinder 4 and the nut 3 respectively are consequently still somewhat spaced from one another. Thereafter directional valve 68 is returned to its original position shown in FIGURE 1, to discharge the pressure medium from the upper cylinder chamber 9, due to which the cylinder 4 together with the load will sink down relatively to the piston and thus relatively to the nuts 2 and 3 and the rod 1 so that the seat surface 13 of the cylinder will rest on the shoulder 14 on the nut 3. Hereby a working stroke of the jack has been completed, which has caused the load to be lifted upwards relatively to the rod 1 a distance, which accurately corresponds to half a turn of the nut 3 around the rod 1. This sequence of operation of the jack may be repeated a desired number of times, at which the tooth 34 will successively assume the stop position indicated by C and D in FIG. 5 and at which each effective displacement of the cylinder 4 and consequently the load relatively to the rod 1 will exactly correspond to the pitch of the thread of the rod 1 along half a turn around the rod independently of any variations in the length of the stroke of the hydraulic force generating means in the jack, i.e. in the relative movement between the piston 5 and the cylinder 4.

The diagram in FIG. 7 shows the movement of the nut 3 provided with a tooth, the cylinder 4 carrying the limit stops and the piston 5, when the jack performs two successive working strokes of the type described above, i.e. with a stationary rod. The horizontal axis of the diagram represents the time, while the vertical axis of the diagram represents the movement relatively to the stationary rod. The dotted curve E represents the movement of the nut 3, while the full curve F represents the movement of the cylinder 4 and the full curve G the movement of the piston 5. It is observed that the nut 3 starts to move somewhat later than the cylinder 4, which is due to the fact that the cylinder 4 must be raised the distance indicated by a in FIG. 1 relatively to the rod 1 before the nut is released by the limit stop and can start to rotate. From the diagram in FIG. 7 it is also apparent that the length of the stroke of the hydraulic force generating means, i.e. the length of the lift of the cylinder 4, is larger than the distance corresponding to the rotation of the nut 3 so that the cylinder 4, when the rotation of the nut and the working stroke has been finished, sinks back a bit down onto the nut, due to which the actual length of the stroke of the jack will be accurately determined by the rotation of the nut.

As the jack shown in the drawing is reversible, it may however also be used in such a way that the cylinder 4 is stationary, while the load is connected to the rod 1, which in this case is movable. In such a case and with the cylinder 4 and the piston 5 in the relative positions shown in FIG. 1 the shoulder 31 on the upper nut 3 will rest on the seat surface 30 on the cylinder 4, while the shoulder 33 on the lower nut 2 will rest on the seat surface 32 on the piston 5. The weight of the load is consequently transferred from the rod 1 to the cylinder 4 through the seat surfaces 31 and 30 on the nut 3 and the cylinder 4 respectively. In such a case the tooth 34 on the nut 3 shall in the starting position rest against one of the other set of limit stops 39a and 39b for instance against 39b in the stop position indicated by A' in FIG. 6.

From this starting position the raising of the rod 1 together with the load relatively to the cylinder 4 is performed in the following way. Pressure medium is supplied to the lower chamber 10 of the cylinder, while pressure medium is discharged from the upper cylinder chamber. Due to this the piston 5 is moved upwards relatively to the stationary cylinder 4 and brings with it the nut 2 and the rod 1 together with the load and the upper nut 3 through the seat surfaces 32 and 33. In this way the shoulder 31 on the upper nut 3 is raised from the seat surface 30 on the cylinder 4 so that this nut becomes unloaded. When the rod 1 together with the nut 3 has been moved upwards somewhat further relatively to the cylinder 4 in FIG. 1, the tooth 34 in the stop position indicated by A' in FIG. 6 is released by the limit stop 39b so that the nut 3 can be rotated downwards around the rod 1. The rotation of the nut 3 is caused by pressure medium being supplied through the pressure medium duct 24 into the chamber 22 of the hydraulic torque motor, at which, as the lower nut 2 is locked, the sleeve 19 together with the upper nut 3 will be rotated in a clockwise direction in FIG. 3, i.e. downwards the rod 1. The rotation of the nut 3 downwards the rod is, however, limited to exactly half a turn due to the fact that the tooth 34 will strike against the other limit stop 39a in the stop position indicated by B' in FIG. 6. Also in this case the length of the working stroke of the cylinder and piston is so adjusted that the rotation of the nut 3 is limited through the cooperation between the tooth 34 and the limit stop 39a and not by contact between the shoulder 31 of the nut and the seat surface 30 on the cylinder 4. When thereafter pressure medium is discharged from the lower cylinder chamber 10, the piston 5 sinks together with the nut 2, the rod 1 and the nut 3 and the load, until the shoulder 31 on the nut 3 is resting on the upper seat surface 30 on the cylinder 4. The effective lifting of the rod 1 together with the load relatively to the cylinder 4 will consequently exactly correspond to the rotation of the nut 3 half a turn around the rod 1.

When thereafter pressure medium is supplied into the upper cylinder chamber 9 in the cylinder 4 and thus the piston 5 is moved further downwards relatively to the stationary cylinder 4, the seat surface 32 leaves the shoulder 33 on the nut 2. The nut 2 becomes consequently unloaded and can be rotated downwards the rod 1 by means of the hydraulic torque motor until the shoulder 33 is again in contact with the seat surface 32 on the piston 5, whereby one working cycle of the jack has been completed. After subsequent working cycles the tooth 34 will successively assume the stop positions indicated by C' and D' in FIG. 6. From the description above it is apparent that in order that the value of the rotation of the nuts 3 shall always be determined by the cooperation between the tooth 34 and the limit stops 38, 39 so that an accurate actual length of stroke for the jack is achieved, the value of the desired rotation of the nut and the length of the stroke of the force generating means shall be so related to one another that the relative movement in the longitudinal direction of the rod between the rod 1 and the nut 3, which corresponds to the limited rotation of the nut 3 around the rod is smaller than the smallest normal length of the stroke of the force generating means, i.e. of the cylinder 4 and the piston 5.

In order that the tooth 34 shall at the rotation of the nut with certainty strike and be stopped by the correct limit stop on the ring 37, the surface of contact between the tooth 34 and the limit stop shall have an extent $a$ (FIG. 1) in the longitudinal direction of the rod 1, when the cooperating seat surfaces 13, 14 or 30, 31, respectively, on the nut 3 and the cylinder 4 are in contact with one another, which is larger than the difference between the largest normal length of the stroke of the hydraulic force generating means and the relative movement in the longitudinal direction of the rod between the nut 3 and the rod 1, which corresponds to the predetermined limited rotation of the nut around the rod 1.

The embodiment of a jack according to the invention shown in the drawings and described above is consequently designed for a rotation of one half of a turn of the nut 3 and for a corresponding actual length of the stroke. It is however evident that any desired larger or smaller actual length of the stroke may be achieved by providing a corresponding suitable number of limit stops 39 and 38 evenly spaced around the rod so that a rotation of the nut 3 corresponding to the desired actual length of the stroke is obtained for each working stroke. It should be observed, however, that the limit stops 38 for the rotation of the nut in the one direction shall all lie in the same plane perpendicular to the rod 1, and that the limit stops 39 for the rotation of the nut in the opposite direction shall also lie in a single plane perpendicular to the longitudinal direction of the rod 1. In order that the limit stops 39 shall not interfere with the tooth 34, when the nut 3 is rotated upwards the rod 1, and the limit stops 38 shall not interfere with the tooth 34, when the nut 3 is rotated downwards the rod 1, the limit stops 38a, 38b in the form of the invention shown in FIG. 1 must however be so situated relatively to the limit stops 39a, 39b, that the nut 3 for an unchanged relative position between the limit stops and the rod 1 may be freely rotated from a position, in which the tooth 34 is in contact with one of the limit stops 38a, 38b, more than 180° around the rod 1, before the tooth 34 strikes and is stopped by one of the limit stops 39a, 39b. The nut must consequently from for instance the position in FIG. 1 be rotatable in the clockwise direction so far that it is stopped not before the tooth 34 strikes against the limit stop 39b. Generally speaking the limit stops for the rotation of the nuts in the one direction must be so situated relatively to the limit stops for the rotation of the nut in the opposite direction that the nut, at an unchanged relative position between the part of the force generating means supporting the limit stops and the rod, can be rotated from a position, in which the tooth on the nut is resting against one of said first-mentioned limit stops, through an angle around the rod, which is at least equally large as the limited rotation of the nut around the rod during a working stroke of the force generating means, before the tooth on the nut strikes against one of said last-mentioned limit stops.

It should also be observed that if the jack is not reversible, only one of the two groups 39 and 38 of limit stops is of course necessary.

Due to the fact that the ring 37 carrying the limit stop is resiliently connected to the cylinder 4 in the longitudinal direction of the rod, as shown in FIG. 1, it is prevented that the rotation limiting device for the nut is damaged in the case that due to any fault in the device the tooth 34 on the nut should be situated beneath one of the limit stops 38a, 38b or above any of the limit stops 39a, 39b respectively, when the working stroke of the force generating means is finished and the cooperating seat surfaces 13, 14 or 31, 30 on the nut 3 and the cylinder 4 respectively are brought into contact with one another under the influence of the weight of the load. In the absence of the springs 36 the weight of the load should in such a case be directly applied on the tooth 34 and the limit stops causing a destruction of these elements. Of course the same safety against such a destruction of the limiting device is obtained, if instead the tooth 34 is resiliently mounted on the nut 3.

As shown in FIGS. 5 and 6 the surfaces of the tooth and the limit stops, which pass one another when the nut is rotated, have preferably the form of helices concentric to the rod 1 and having substantially the same pitch as the thread on the rod.

As apparent from the FIGURES 1 and 4 the tooth 34 is preferably arranged on a ring 30, which is peripherally movable around the nut 3 to different positions, in which it may be locked relatively to the nut by means of a screw 41. This adjustability of the tooth 34 is particularly advantageous, when large loads are moved by means of several jacks working in parallel, as it makes it possible to place the teeth on the separate jacks in a starting position, in which the load is in a desired required position, so that all jacks have their associated teeth in accurately the same position.

In the embodiment of the invention shown in the drawings and described above the nuts can by means of the hydraulic torque motor only be rotated somewhat less than one turn each time. In this embodiment of the invention it is consequently not possible to operate with a larger predetermined rotation of the nut 3 than somewhat less than one turn. If one should wish to rotate the nut 3 a complete turn or more for each working stroke, the jack must consequently be provided with a rotating means for the nut which is capable of rotating the nuts to such a larger extent each time. This may be achieved by means of two hydraulic torque motors each being designed for a relative rotation somewhat less than one turn between the movable parts of the torque motor concerned, in which case one movable part of the one torque motor shall be mechanically connected to the one movable part of the other torque motor, while the remaining movable parts of the two torque motors are connected to each one of the nuts, besides which the pressure chambers of the two hydraulic torque motors shall be so interconnected that the rotational movements of the two torque motors are added, when the nuts are rotated relatively to one another. In this way a maximum relative rotation between the nuts of somewhat less than two full turns may be achieved. A still larger rotation of the nuts can of course be obtained, if desired, by adding additional hydraulic torque motors. Also in such an embodiment of the invention the hydraulic torque motors are preferably arranged coaxially around the threaded rod above one another beneath the two nuts, in which case the pressure chamber of at least one of the torque motors may consist of an annular channel in one of the nuts. While devices for rotating the nuts of the type described above have proved to be particularly advantageous, also other means for rotating the nuts may be used in connection with the invention. Other devices for rotating the nuts around the rods than hydraulic torque motors may thus be used and the device for rotating the nuts does not have to constitute a part of the jack proper but may be constructed as a separate unit, e.g. consisting of an electric motor or similar power source with necessary gearing means, which is connected to the two nuts by means of driving chains or similar.

Also other modifications of the embodiment of the invention shown in the drawings and described above are possible within the scope of the invention. Thus, for instance, the piston 5 instead of the cylinder 4 may be the part of the force generating means which is connected to the load or is stationary if the load is connected to rod 1. The same function of the limiting device for the rotation of the nuts is of course obtained, if the limiting device is situated between the piston 5 and the nut 2 cooperating with the piston instead of between the cylinder 4 and the nut 3 as shown in the drawings.

In order to receive an indication that a rotation of the nut has really taken place and that thus the jack has performed an intended working stroke, the nut 3 carrying the tooth 34 may, as already mentioned above, also be provided with a cam 42 arranged to actuate, when the nut is rotated, two micro-switches 43a and 43b, which are stationary arranged on the cylinder 4 and provided with actuating means 41a and 44b respectively, e.g. in the form of rolls, which are resting against the periphery of the nut 3 in the manner shown in FIGS. 1 and 8a. The microswitches 43a and 43b are, however, not shown in FIG. 1.

FIGURES 8a and 8b show the nut 3 in a position corresponding to the tooth 34 resting against the limit stop 38a, when the nut 3 is rotated upwards the rod in FIG. 1 e.g. in the counter-clockwise direction in FIGS. 8a and 8b, which direction of rotation, as may be recalled, exists when the jack is operating with a stationary rod. In this position the cam 42 on the nut 3 actuates the micro-switch 43a, as seen in FIG. 8a, so that this switch is closed for instance and by a signal to a central control equipment indicates that the nut 3 is in this position. In this case the other micro-switch 43b is open.

If thereafter the jack performs a working stroke and consequently the nut 3 is rotated half a turn to the other stop position, the nut will assume the position shown in FIGS. 9a and 9b. In this moment the tooth 34 of the nut will consequently rest against the other limit stop 38b for this direction of rotation, simultaneously as the cam 42 actuates the other switch 43b so that this switch is closed, while the micro-switch 43a is open. The closure of the micro-switch 43b conveys an indication to the control equipment that the nut has been rotated half a turn, i.e. that the jack has really performed the intended working stroke.

In the central control equipment for the jack the signals from the micro-switches 43a and 43b may influence means, which control the supply of pressure medium to the hydraulic force generating means of the jack, i.e. to the cylinder 4, in such a way that a second working stroke of the jack is started not before the micro-switches have indicated that the preceding working stroke has really been carried out. When several jacks are working in parallel, the signals from the micro-switches of the separate jacks may together influence the control means for the pressure medium supply to the jacks so that a new working stroke for the jacks is started not before the micro-switches of the jacks have indicated that all jacks have performed the preceding working stroke. In this way it is automatically checked that no one of the jacks has dropped out due to faults.

Figure 10A:
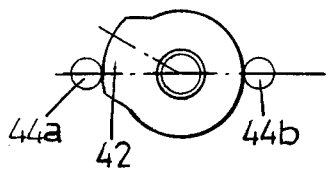
Figure 10B:
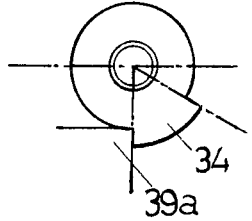
Figure 11A:
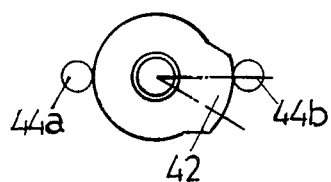
Figure 11B:
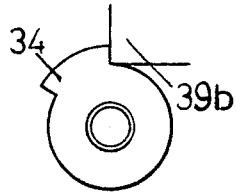

The FIGURES 10a and 10b and the FIGURES 11a and 11b show the different stop positions of the nut 3, when the nut is rotated downwards the rod 1 in FIG. 1, i.e. in the clockwise direction in FIGS. 10 and 11, which direction of rotation for the nut 3 exists if the jack is operating with a movable rod 1 connected to the load and a stationary cylinder 4. The different stop positions of the nut 3 are consequently in this case defined by cooperation between the tooth 34 and the limit stops 39a and 39b. The check signals are however also for this direction of rotation of the nut 3 obtained by means of the same cam 42 on the nut 3 and the same microswitches 43a and 43b. In order that the same cam on the nut 3 and the same micro-switches shall be usable for both directions of rotation of the nut it is, however, required that the sum of the sector angle $\alpha$ around the rod 1 enclosed by the tooth 34 and the sector angle $\beta$ enclosed by the cam 42 is at least equally large as the sector angle $\gamma$ between two adjacent limit stops operative for opposite directions of rotation of the nut 3, e.g. the angle between the limit stops 38a and 39a or the equally large angle between the limit stops 38b and 39b. This condition is met in the embodiment of the invention shown in the drawings.

In such a case where the above-mentioned condition is not met, the nut must be provided with two cams one of them cooperating with a first group of micro-switches corresponding to the stop positions for the nut, when the nut is rotated in the one direction, while the other cam is cooperating with another group of micro-switches corresponding to the stop positions of the nut, when this is rotated in the opposite direction.

In the embodiment of the check signal device shown in the drawings it has consequently been assumed that the jack is intended for a rotation of half a turn of the nut each time, so that the nut has two stop positions for each direction of rotation, in which case the check signal device must comprise a corresponding number of signal means, i.e. in the present case two micro-switches, actuated by the cam on the nut. If the jack is designed for another effective length of the stroke, i.e. for another amount of rotation of the nut, and consequently has another number of limit stops for each direction of rotation of the nut, the check signal device must of course comprise another member of micro-switches corresponding to the number of limit stops so arranged that each microswitch is actuated by the cam on the nut, when the nut assumes a specific one of its different stop positions.

If the jack is designed for an effective length of the stroke corresponding to a rotation of one turn of the nut so that the nut only has one stop position in each direction of rotation, the check signal device will consequently comprise only one micro-switch or possibly one micro-switch for each direction of rotation, and the same micro-switch will consequently be actuated by the cam for each rotation of the nut. In spite of this it is easy to obtain an indication that a rotation of the nut has really been performed by inserting the micro-switch in an electric circuit of the conventional type, which is responsive to the opening of the micro-switch, when the nut is rotated, and the reclosure of the micro-switch, when the nut once again assumes its stop position.

The signal means, e.g. the micro-switches, may according to the invention also be adapted to control a counting device, which counts the number of actuations of the signal means, whereby an automatic indication or registration may be obtained of the total distance, which the load has been moved by means of the jack.

The cam 42 on the nut and/or those parts 44 of the signal means 43 which cooperate with the cam should preferably have such an extent in the longitudinal direction of the rod that their cooperation is not influenced by the relative movement in the longitudinal direction between the nut 3 and the cylinder 4 carrying the microswitches.

It should, however, be observed that according to the invention also other types of signal means that microswitches may of course be used and the actuation of the signal means does not have to be mechanical by means of a cam on the nut. The signal means may for instance consist of photocells actuated by light transmitted or reflected from the nut 3 or by an induction coil actuated by a magnetic portion of the nut.

FIGS. 12 and 13 in the drawings show a lifting equipment according to the invention for lifting floor-slabs or lift-slabs along a stationary, vertical, supporting column, when erecting multi-storey building structures according to the lift-slab method. The FIGURES 12 and 13 show only one supporting column and the parts of the lifting equipment associated with this column. The drawings show the lifting equipment while raising the first or uppermost lift-slab 45 along the supporting column 46. For this purpose the lifting equipment comprises two separate jacks 47' and 47" cooperating with each one vertical, threaded rod 48' and 48" respectively. These threaded rods are at their upper ends attached to a horizontal beam 49 connected to the supporting column 46 at the top thereof. The jacks are only shown schematically and are preferably of the type shown and described in connection with FIGS. 1 to 11 of the drawing, with the exception that the jacks do not include any means for rotating the nuts of the jacks. Further, only one of the jacks 47' and 47" has to be provided with locking means defining the angular locking positions of the one nut in the jack. In the embodiment of the invention shown in the drawing each jack is provided with a cylindrical casing substantially completely surrounding the jack. This casing is permanently connected to the hydraulic cylinder of the jack and may constitute a part of this cylinder and is provided with an upper flange and a lower flange. The jacks are mounted on the upper surface of the lift-slab 45, for instance by means of bolts passing through the lower flange of the casings of the jacks. When working the two jacks will consequently move upwards along the threaded rods 48' and 48" respectively and raise the lift-slab 45 along the supporting column 46, which passes through an opening 50 in the lift-slab. The rods 48' and 48" are also passing through suitable openings in the lift-slab.

In order to ascertain that the two jacks are operating in complete synchronism and that their length of stroke is exactly the same, the lifting equipment is provided with a separate torque generator 51 common to both jacks. This torque generator is disposed symmetrically with respect to the jacks at one side of the supporting column 46 and is supported from the two jacks by horizontal arms 52' and 52" extending from the casings of the two jacks. The torque generator 51 comprises two mutually rotatable coaxial members 53 and 54. The torque generator may for instance consist of a hydraulic torque motor of substantially the same type as used in the jack shown and described in connection with FIGS. 1 to 11. The two members 53, 54 of the torque generator 51 can consequently be rotated relative one another somewhat less than 350° by supplying a pressure fluid to the torque motor, for instance through the vertical stationary shaft 55 of the torque motor. The upper nut of each jack is provided with a sprocket wheel 56' and 56" respectively. In the same way the lower nuts of the two jacks are provided with each one sprocket wheel, whereof only the sprocket wheel 57' on the lower nut in the jack 47' can be seen in FIG. 13 of the drawing. The two rotatable members 53, 54 of the hydraulic torque motor 51 are also provided with sprocket wheels 58 and 59 respectively. A sprocket chain 60 is running over the sprocket wheel 58 of the member 54 of the torque motor 51 and over the sprocket wheels 56' and 56" on the upper nuts on the two jacks and further over two guide sprocket wheels 61 journalled in the supporting arms 52' and 52" respectively. In the same way a second sprocket chain 62 is running over the sprocket wheel 59 of the other rotatable member 53 of the torque motor 51 and over the sprocket wheels on the lower nuts in the two jacks and over two guide sprocket wheels 63 journalled in the supporting arms 52' and 52" respectively. The sprocket chains 60 and 62 are passing through openings 64 in the casing of the jacks. Preferably the sprocket wheels on the nuts in the jacks are axially displaceable relative the associated nut and in at least one of the jacks the sprocket wheels are preferably adjustable in circumferential direction relative the associated nut.

The upper nuts on both jacks can consequently be rotated simultaneously and through exactly the same angle by the sprocket chain 60 driven by the rotatable member 54 of the torque generator 51 and the locking means in one of the jacks will ascertain that the nuts are rotated a predetermined constant angle around their rods. In the same way the lower nuts of the two jacks can be rotated simultaneously and through exactly the same angle around their rods by the sprocket chain 62 driven from the other rotatable member 53 of the torque motor 51. The sprocket wheels 58 and 59 on the rotatable members of the torque motor 51 have preferably a larger diameter than the sprocket wheels on the nuts in the jacks, whereby the nuts can be rotated 360° or more around their respective rods each time in spite of the fact that the rotatable members of the torque motor 51 can be rotated only somewhat less than 360° relative one another.

When the first or uppermost lift-slab 45 has been raised together with the lifting equipment to the top of the supporting column 46 it is parked immediately below the top of the column by means of for instance a wedge 65 inserted through an opening in the supporting column. In this way the first or uppermost lift-slabs 45 will be stationarily supported by the column 46 near to the top thereof. Thereafter the rods 48' and 48" are disconnected from the horizontal beam 49 and their lower ends are attached to the next lift-slab or lift-slabs and the mode of operation of the two jacks is reversed so that the jacks, which are now stationary, can raise the rods 48', 48" and the lift-slab or lift-slabs attached to the lower ends of the rods along the supporting column 46. During this lifting of further lift-slabs along the column 46 the jacks may be mounted on the upper surface of the first lift-slab 45 or may be disconnected from this lift-slab and instead connected to the horizontal beam 49, whereby the load of the further lift-slabs is transferred directly to the supporting column. In this way it will not be necessary to dimension the first or uppermost lift-slab 45 for the additional load of further lift-slabs. During the lifting of the further lift-slabs a second section may be erected on the top of the supporting column 46. When all lift-slabs, except those to be permanently fastened to the first section of the column 46, have been raised to the top of the first section of the column, the upper ends of the rods are connected to the upper end of this second section of the column and the first lift-slab 44 raised to the top of this second section together with the lifting equipment, and so on. As the lifting equipment and particularly the sprocket chains for the nuts in the jacks are not completely encircling the supporting column 46 the top of the column is easily accessible for the erection of a second section of the column and for the insertion of wedges 63 for temporarily parking the lift-slabs below the top of the column 46.

We claim:

1. In a lifting apparatus including a threaded rod adapted to have a jack mounted thereon, a jack comprising: coaxially disposed, independently rotatable first and second nuts; force generating means including at least two members reciprocally movable relative to each other in the axial direction of said nuts; a seat surface on one of said members adapted to cooperate with a corresponding seat surface on said first nut to transmit forces therebetween; a seat surface on the other of said members adapted to cooperate with a corresponding seat surface on said second nut to transmit forces therebetween; means for reciprocating said members; means for alternately rotating said first and second nuts in the same direction in correlation with the movement of said members of said force generating means; locking means between said first nut and said one member adapted to cooperate with said first nut to stop and lock said first nut in a predetermined angular locking position, said one member being axially movable to release said first nut for rotation through a predetermined angle until it again reaches an angular locking position defined by said locking means.

2. A jack as defined in claim 1, wherein said locking means include plural angular locking positions for said first nut at substantially evenly spaced intervals around said threaded rod.

3. A jack as defined in claim 1, wherein said locking means between said first nut and said one member includes a radially extending tooth on said first nut and a limit stop on said one member disposed to engage said tooth and thereby stop said first nut in a predetermined angular locking position when said first nut is rotated in one direction and to disengage said tooth and thereby release said first nut when said one member is moved axially of said rod.

4. A jack as defined in claim 3, wherein there are a plurality of limit stops on said one member, said limit stops being disposed in a common plane perpendicular to the axes of said nuts and evenly spaced around said one member, whereby said first nut can be stopped in different angular locking positions.

5. A jack as defined in claim 3, wherein the tooth on said first nut is adjustable circumferentially of said first nut.

6. A jack as defined in claim 3, together with means resiliently supporting said tooth for movement axially of said nut.

7. A jack as defined in claim 3, wherein said limit stop is resiliently supported by said one member in the axial direction.

8. A jack as defined in claim 3, wherein those surfaces on the said tooth and said limit stop which are facing when said tooth is moved past the limit stop by rotation of said first nut are parallel and disposed at substantially the same angle to a plane perpendicular to the axes of said nuts as the thread on said nuts.

9. A jack as defined in claim 3, wherein a rotation of said first nut from one angular locking position defined by said locking means to a subsequent angular locking position corresponds to a relative movement in the axial direction of said first nut which is smaller than the smallest normal relative movement of said two members of said force generating means in the axial direction.

10. A jack as defined in claim 3, wherein said tooth and said limit stop have a mutual area of contact which has an extension in the axial direction when said seat surface on said first nut and said cooperating seat surface on said one member are in contact with each other larger than the difference between the largest normal relative movement between said two members of said force generating means in the axial direction and the axial movement of said first nut corresponding to a rotation of said first nut from one angular locking position defined by said locking means to a subsequent angular locking position defined by said locking means.

11. A jack as defined in claim 1, comprising means for attaching said load to one of said two members of said force generating means.

12. A jack as defined in claim 1, comprising means for mounting said force generating means on a stationary support while said load is attached to said rod.

13. A jack as defined in claim 1, wherein said force generating means include at least one hydraulic cylinder, a piston movable within said cylinder in the longitudinal direction of said rod, and means for supplying fluid under pressure to said cylinder on at least one side of said piston.

14. A jack including a threaded rod for moving a load in the axial direction of said rod comprising: a first nut and a second nut individually rotatable around said rod; force generating means including at least two members reciprocatingly movable relative one another axially of said rod; two seat surfaces on one of said members of said force generating means alternatively cooperating with corresponding seat surfaces on said first nut when said one member is stationary relative to said rod for transferring loads between said one member and said first nut; two seat surfaces on the other member of said force generating means alternatively cooperating with corresponding seat surfaces on said second nut when said other member is stationary relative to said rod for transferring loads between said other member and said second nut; means for rotating said nuts alternately around said rod in step with the relative movement of said members of said force generating means; first locking means between said first nut and said one member cooperating with said first nut for stopping and locking said first nut in a predetermined angular locking position when said first nut is rotated in one direction around said rod and said one member is stationary relative to the rod and for releasing said first nut when said one member is moved axially in a direction corresponding to the direction of rotation of the nut; and second locking means between said first nut and said one member cooperating with said first nut for stopping and locking said nut in a predetermined angular locking position when said first nut is rotated in the opposite direction around said rod and said one member is stationary relative to said rod and for releasing said first nut when said one member is moved relative to said rod in the axial direction of said rod corresponding to said opposite direction of rotation of said nut.

15. A jack as defined in claim 14 wherein said first and second locking means comprise a tooth on said first nut common to both locking means and extending radially outwards from said nut; said first locking means having a first limit stop supported by said one member and disposed to engage said tooth when said first nut is rotated in one direction around said rod and said one member is stationary relative to said rod and to disengage said tooth and release said first nut when said one member is moved axially along said rod in a direction corresponding to said one direction of rotation of said first nut; said second locking means having a second limit stop supported by said one member and disposed to engage said tooth and stop said first nut in a predetermined angular locking position when said first nut is rotated in the opposite direction around said rod and said one member is stationary relative to said rod and to disengage said tooth and release said first nut when said one member is moved axially along the rod in the direction coresponding to said opposite direction of rotation of said first nut; said first limit stop and said second limit stop being spaced to permit at least a full revolution of said first nut around said rod between said first limit stop and said second limit stop when said one member is stationary relative to said rod.

16. A jack as defined in claim 15, wherein said first locking means include a first plurality of angular locking positions evenly spaced around the rod and said second locking means includes a second plurality of angular locking positions evenly spaced around the rod.

17. A jack as defined in claim 16, wherein said first and second locking means comprise a tooth on said first nut common to both said locking means and extending radially outwards from the nut; said first locking means comprises a first set of limit stops supported by said one member and disposed in a common plane perpendicular to said rod, said limit stops being evenly spaced around said rod for engaging said tooth and stopping said first nut when it is rotated around the rod in said one direction and said one member is stationary relative to said rod and for disengaging said tooth and releasing said nut when said one member is moved in the axial direction of said rod corresponding to said one direction of rotation of said first nut; said second locking means comprises a second set of limit stops supported by said one member, disposed in a common plane perpendicular to said rod, and evenly spaced around said rod for engaging said tooth and stopping said first nut when the nut is rotated in said opposite direction around said rod and said one member is stationary relative to said rod and for disengaging said tooth and releasing said first nut when said one member is moved in the axial direction of said rod corresponding to said opposite direction of rotation of said first nut; said first and said second sets of limit stops being mutually disposed to permit a rotation of said first nut around said rod when said member is stationary relative to said rod from an angular locking position defined by said first set of limit stops to an angular locking position defined by said second set of limit stops through an angle of larger magnitude than an angle between two subsequent angular locking positions defined by one of said sets of limit stops.

18. In a load-lifting assembly, a jack including a threaded rod for moving a load axially of said rod comprising: a first nut and a second nut independently rotatable around said rod; force generating means including at least two members reciprocatingly movable relative to one another axially of said rod; at least one seat surface on one of said members of said force generating means adapted to cooperate with a corresponding seat surface on said first nut when said one member is stationary relative to said rod for transferring said load between said one member and said first nut; at least one seat surface on the other member of said force generating means adapted to cooperate with a corresponding seat surface on said second nut when said other member is stationary relative to the rod for transferring said load between said other member and said second nut; means for rotating said first and second nuts alternately in at least one direction around said rod in step with the relative movement of said two members of said force generating means; locking means between said first nut and said one member for stopping said first nut in at least one predetermined angular locking position when said nut is rotated around said rod and said one member is stationary relative to said rod and for releasing said first nut when said one member is moved relative to said rod; signal generating means on said one member; and actuating means on said first nut for actuating said signal generating means each time said first nut occupies said angular locking position.

19. A jack as defined in claim 18, wherein said signal generating means comprise a plurality of signal generating devices corresponding to different angular locking positions and disposed to be selectively actuated by said actuating means when said first nut occupies said different angular locking positions so that a predetermined signal generating device is actuated for each angular locking position.

20. A jack as defined in claim 18, wherein said signal generating means includes an electric switch supported by said one member and said actuating means includes a cam supported by said first nut and disposed to actuate said electric switch when said first nut is in an angular locking position defined by said locking means.

21. A jack as defined in claim 18, together with counting means operatively connected to said signal generating means for counting the number of actuations of said signal generating means caused by said actuating means.

22. A jack as defined in claim 18, including control means for said force generating means, said control means being connected to said signal generating means.

23. A jack including a threaded rod for moving a load axially of said rod, comprising: a first nut and a second nut independently rotatable around said rod; force generating means including at least two members reciprocatingly movable relative to one another axially of said rod and capable of exerting a mutual axial force; at least one seat surface on one of said members of said force generating means adapted to cooperate with a corresponding seat surface on said first nut when said one member is stationary relative to the rod for transferring said load between said one member and said first nut; at least one seat surface on the other member of said force generating means adapted to cooperate with a corresponding seat surface on said second nut when said other member is stationary relative to said rod for transferring said load between said other member and said second nut; torque generating means for alternately rotating said first and said second nuts in the same direction around said rod in step with the mutual movement of the members of said force generating means, said torque generating means comprising a hydraulic torque motor including two mutually rotatable coaxial members, one of said members containing a fluid chamber in the form of a partial annulus coaxially disposed in said one member and said other member having a vane located in said fluid chamber and movable therein from one end of said chamber to the opposite end of said chamber and means for supplying fluid under pressure to said chamber on either side of said vane, said one member of said torque motor being coupled to one of said nuts and said other member of said torque motor being coupled to the other of said nuts.

24. A jack as defined in claim 23, wherein said hydraulic torque motor is disposed coaxially around said rod between said first and second nuts.

25. A jack as defined in claim 23, wherein said one member of said hydraulic torque motor includes a portion of one of said nuts; said fluid chamber includes a groove in the circumferential surface of said one nut; and said other member of said hydraulic torque motor comprises a sleeve surrounding said portion of said one nut and having said vane attached to its inner side and disposed in said groove, said sleeve being connected to said other nut through means permitting a mutual movement between said sleeve and said other nut in the axial direction of said rod.

26. Apparatus as defined in claim 23, wherein said torque generating means is drive connected to a plurality of said jacks.

27. In lifting apparatus of the step-by-step type, a jack comprising: coaxially disposed, independently rotatable first and second nuts; force generating means including at least two members movable relative to each other in the axial direction of said nuts and means for reciprocating said members; cooperating means incorporated in the first nut and one of said members and in the second nut and the other of said members for transferring loads between the first nut and said one member and the second nut and the other member, respectively; means for alternately rotating said first and second nuts in correlation with the movement of the members of said force generating means; locking means between the first nut and the one of said members adapted to cooperate therewith for stopping and locking said first nut in a predetermined angular locking position, said one member being axially movable to release said first nut for rotation through a predetermined angle.

References Cited by the Examiner
UNITED STATES PATENTS

| | | | |
|---|---|---|---|
| 912,124 | 2/1909 | Hanson | 74—822 |
| 1,117,516 | 11/1914 | Petrie | 92—29 X |
| 2,583,775 | 1/1952 | Hyde | 74—424.8 |
| 3,053,015 | 9/1962 | Graham | 254—89 X |
| 3,122,027 | 2/1964 | Frisch | 74—128 |

BROUGHTON G. DURHAM, *Primary Examiner.*

DONALD P. ROONEY, JONATHAN A. MARSHALL, *Assistant Examiners.*